UNITED STATES PATENT OFFICE.

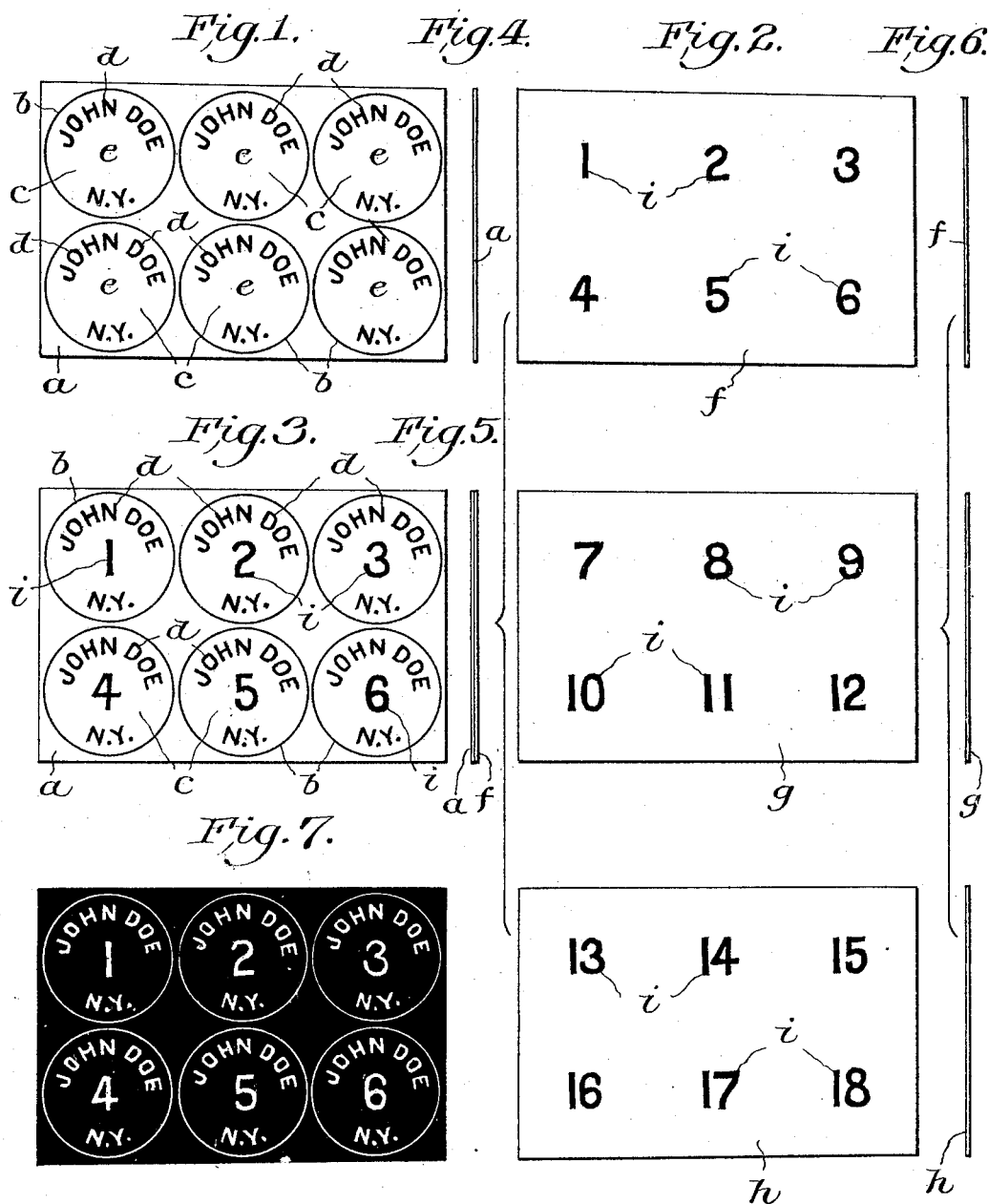

JULIUS ABRAHAMS, OF MILLBOURNE, PENNSYLVANIA.

ART OF MAKING PHOTOGRAPHIC PRINTS.

1,410,151.  Specification of Letters Patent.  Patented Mar. 21, 1922.

Application filed January 24, 1921. Serial No. 439,562.

*To all whom it may concern:*

Be it known that I, JULIUS ABRAHAMS, a citizen of the United States, residing at Millbourne, in the county of Delaware and State of Pennsylvania, have invented certain new and useful Improvements in the Art of Making Photographic Prints, of which the following is a specification.

This invention relates to improvements in the art of and means for making a numbered set of like photographic prints.

The invention is particularly adapted for making numbered sets of prints for use in identification badges for employees in large business establishments.

The badges for a particular establishment are alike in the device or devices thereon which indicate the particular establishment, and they differ from one another only in each having thereon a number differing from the others to identify the individual employee wearing the badge.

In badges of this character it is desirable that the said numbers, as well as the said devices, shall appear in a light color upon a background or in a field of a darker color, preferably white against black, to permit them to be easily read at a distance and at close range.

Heretofore it has been very costly to produce the desired characteristics, above set forth, in a numbered set of badges which are satisfactory as to smoothness and appearance; and the primary object of the present invention is to provide a novel, simple and efficient means which will permit the production of satisfactory badges having the said desired characteristics, at a much lower cost than has been possible prior to this invention.

The invention may be employed for other useful purposes and it consists in the novel art of and means for producing the desired prints, as will be hereinafter described and claimed.

In the accompanying drawings, illustrating a form of embodiment of my improved means for making photographic prints in accordance with my invention, Figure 1 is a face view of a master sheet of transparent material having certain opaque devices thereon.

Figure 2 is a face view of a set of sheets of transparent material having certain opaque numbers thereon.

Figure 3 is a face view of the sheet shown in Fig. 1 and one of the sheets of the set shown in Fig. 2 placed one upon the other.

Figures 4, 5 and 6 are edge views of the sheets shown in Figs. 1, 2 and 3, respectively.

Figure 7 is a view of a photographic print made in accordance with my invention.

Referring to the drawings, $a$ designates a thin sheet of transparent material such as celluloid; and printed, painted or otherwise suitably placed thereon are a series or set of lines $b$ enclosing a plurality of fields $c$ of the size and shape of the photographic prints to be produced.

Within the fields $c$ is a set or plurality of opaque devices $d$, one within each field. The devices $d$ are alike in every particular, so that each field presents exactly the same appearance, as shown in Fig. 1; and within the fields $c$ adjacent to the devices $d$ therein is a set or plurality of blank spaces, one for each device, indicated at $e$. The devices $d$ may be printed, painted or otherwise suitably placed upon the sheet $a$.

The sheets $f$, $g$ and $h$ of the set shown in Figs. 2 and 6, respectively, are formed of thin transparent material, such as celluloid, and each are of the same shape and size as the sheet $a$; and printed, painted or otherwise suitably placed on each sheet $f$, $g$ and $h$ is a plurality of opaque numbers $i$. The numbers of each sheet of the set are different from each other and different from the numbers of any other sheet of the set. As herein illustrated, the said opaque numbers of the several sheets of the set range from one to eighteen.

The opaque numbers $i$ on each sheet of the set correspond in number and positions thereon with the number and positions of the blank spaces $e$ on the master sheet $a$, so that when the master sheet $a$ and a sheet, $f$ for example, of the said set are placed one upon another, as shown in Fig. 3, the opaque numbers of the sheet $f$ will appear in the blank spaces $e$ of the sheet $a$.

Now, in making a numbered set of like photographic prints, in accordance with my invention, by the aid of the sheets illustrated in the drawings, the sheet $f$ of the said set and the master sheet $a$ are placed one upon the other with their edges in registry and with the numbers $i$ of the sheet $f$ in registry with the blank spaces $e$ of the master sheet $a$, as shown in Fig. 3. The two sheets $a$ and $f$ are then placed within an ordinary photographer's printing frame with a sheet of sensitized photographic paper back of the sheets *a* and *f*, and the same are exposed to the light which passes through the sheets *a* and *f* and acts upon the photographic paper back of them, excepting such parts of the paper from which the light rays are excluded by the opaque devices *d* and numbers *i* on the transparent sheets, resulting in a print which, when subsequently developed, appears as shown in Fig. 7. The six units surrounded by the lines on the print which were printed from the lines *b* of the master sheet *a* are cut on the said lines, resulting in six units or prints which are alike excepting as to the numbers thereon. The remaining sheets *g* and *h* of the set are associated with the master sheet in the same manner and prints are made therefrom and the six units of each print enclosed by the lines printed from the lines *b* of the master sheet are cut therefrom.

It will now be understood that eighteen separate units or prints may be produced, with the aid of the sheets shown in the drawings, and as above set forth, that the eighteen units or prints will be alike in every particular excepting as to the numbers thereon, and that the eighteen units will form a numbered set of like prints, the numbers of which range from one to eighteen.

Prints thus formed may be used in a suitable badge frame between a backing plate in the rear thereof and a transparent plate in the front thereof.

I have shown six units or devices on the master sheet *a*, and six numbers on each sheet of the said set, and three sheets in the said set, for illustrative purposes only. Generally, the number of devices *d* on the master sheet *a* would be far in excess of six, and the numbers *i* on each sheet of the said set would, correspondingly, be far in excess of six, and also the sheets employed in the said set would be in excess of three. These changes would be governed, however, by the size of the units or individual prints of the set desired and by the number of prints desired in the set.

I claim as my invention:

1. The art of making a numbered set of like photographic prints which consists in employing a sheet of transparent material having a plurality of opaque devices thereon of like character and a plurality of blank spaces corresponding in numbers with and positioned adjacent to said devices; and in employing a plurality of sets of opaque numbers, the numbers of each set being different from each other and from the numbers of any other of the sets, and the numbers of each set being held by transparent means in relative position to register with said spaces; and in placing the sets of numbers successively in registry with the said spaces; and in making photographic prints of the thus formed combinations of the said devices and the said sets of numbers.

2. In a photographic printing device for making a numbered set of like prints, and in combination, a sheet of transparent material having a plurality of opaque devices thereon of like character and a plurality of blank spaces corresponding in number with and positioned adjacent to said devices; a set of a plurality of sets of opaque numbers, the numbers of each set being different from each other and from the numbers of any other of the sets; and transparent means for holding the numbers of each set in relative position to register with said spaces; the sets of numbers being adapted to be placed successively in registry with said spaces for making prints of the thus formed combinations of the said devices and the said sets of numbers.

3. In a photographic printing device for making a numbered set of like prints, and in combination, a master sheet of transparent material having a plurality of opaque devices thereon of like character, and a plurality of blank spaces corresponding in number with and positioned adjacent to said devices; and a sheet of a set of sheets of transparent material, each sheet having a plurality of different opaque numbers located thereon to register with the said blank spaces of the master sheet when a sheet of said set and the master sheet are placed one upon another, the numbers on each sheet of said set being different from each other and from the numbers of any other sheet of the set; the sheets of said set being adapted successively to be placed adjacent to the master sheet with their numbers in registry with the blank spaces of the master sheet for making prints of the thus formed combinations of the said devices and the said sets of numbers.

In testimony whereof I affix my signature hereto.

JULIUS ABRAHAMS